United States Patent
Sun et al.

(10) Patent No.: US 10,647,252 B2
(45) Date of Patent: May 12, 2020

(54) PORTABLE ELECTRONIC DEVICE AND OPERATING METHOD THEREFOR

(71) Applicant: SAMSUNG ELECTRONICS CO., LTD., Suwon-si (KR)

(72) Inventors: Changwei Sun, Beijing (CN); Kun Li, Beijing (CN); Jiehua Chen, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/171,984

(22) Filed: Oct. 26, 2018

(65) Prior Publication Data

US 2019/0071012 A1    Mar. 7, 2019

Related U.S. Application Data

(63) Continuation of application No. 15/569,578, filed as application No. PCT/KR2016/005435 on May 23, 2016, now Pat. No. 10,137,737.

(30) Foreign Application Priority Data

Jun. 8, 2015   (CN) .......................... 2015 1 0308937
May 17, 2016   (KR) ........................ 10-2016-0060365

(51) Int. Cl.
*B60Q 9/00*    (2006.01)
*H04M 1/725*   (2006.01)
(Continued)

(52) U.S. Cl.
CPC .................. *B60Q 9/00* (2013.01); *B60C 9/00* (2013.01); *B60R 11/02* (2013.01);
(Continued)

(58) Field of Classification Search
CPC .. B60Q 9/00; B60C 9/00; B60R 11/02; B60R 2011/0008; B60R 2011/0071;
(Continued)

(56) References Cited

U.S. PATENT DOCUMENTS 9,037,125 B1   5/2015 Kadous
9,253,604 B2   2/2016 Park et al.
(Continued)

FOREIGN PATENT DOCUMENTS

JP    10-206787 A    8/1998
KR    10-0630163 B1  9/2006
(Continued)

OTHER PUBLICATIONS

Search Report dated Aug. 30, 2016, issued by the International Searching Authority in counterpart International Patent Application No. PCT/KR2016/005435 (PCT/ISA/210).
Written Opinion dated Aug. 30, 2016, issued by the International Searching Authority in counterpart International Patent Application No. PCT/KR2016/005435 (PCT/ISA/237).

*Primary Examiner* — Ryan W Sherwin
(74) *Attorney, Agent, or Firm* — Sughrue Mion, PLLC

(57) ABSTRACT

Provided is a portable electronic device including: a sensor; and a control unit controlling the sensor so as to obtain movement information of the portable electronic device in order to detect a movement of at least a part of a user's arm, determining whether the user is in a driving state on the basis of the movement information, automatically switching into a driving mode on the basis of the determination, and activating at least one function relating to driving among the functions of the portable electronic device on the basis of the switching into the driving mode.

16 Claims, 10 Drawing Sheets

(51) Int. Cl.
*B60R 11/02* (2006.01)
*B60C 9/00* (2006.01)
*B60R 21/0132* (2006.01)
*B60R 21/00* (2006.01)
*B60R 11/00* (2006.01)

(52) U.S. Cl.
CPC ... *H04M 1/72538* (2013.01); *H04M 1/72577* (2013.01); *B60R 21/0132* (2013.01); *B60R 2011/0008* (2013.01); *B60R 2011/0071* (2013.01); *B60R 2021/0027* (2013.01); *B60Y 2302/03* (2013.01); *B60Y 2400/902* (2013.01); *H04M 2250/12* (2013.01)

(58) Field of Classification Search
CPC ........ B60R 21/0132; B60R 2021/0027; B60Y 2400/902; B60Y 2302/03; A61B 5/1121; A61B 5/681; A61B 2562/0219; B60K 28/06; B60W 50/08; B60W 50/14; B60W 2040/0836; H04M 1/72519; H04M 1/72577; H04M 2250/12; H04M 1/72538
See application file for complete search history.

(56) References Cited

U.S. PATENT DOCUMENTS

| | | | |
|---|---|---|---|
| 2004/0064248 A1* | 4/2004 | Holze | G01C 21/3682 |
| | | | 701/431 |
| 2006/0177098 A1* | 8/2006 | Stam | B60Q 1/085 |
| | | | 382/104 |
| 2007/0026850 A1 | 2/2007 | Keohane | |
| 2009/0100384 A1 | 4/2009 | Louch | |
| 2014/0118498 A1 | 5/2014 | Lee et al. | |
| 2015/0342542 A1 | 12/2015 | An | |
| 2016/0278664 A1 | 9/2016 | Pant | |
| 2016/0327407 A1 | 11/2016 | Park | |

FOREIGN PATENT DOCUMENTS

| | | |
|---|---|---|
| KR | 10-2014-0028657 A | 3/2014 |
| KR | 10-2015-0029453 A | 3/2015 |
| WO | 2014/107013 A1 | 7/2014 |
| WO | 2014/126304 A1 | 8/2014 |
| WO | 2016189358 | 12/2016 |

* cited by examiner

AIR COMPOSITION IN VEHICLE

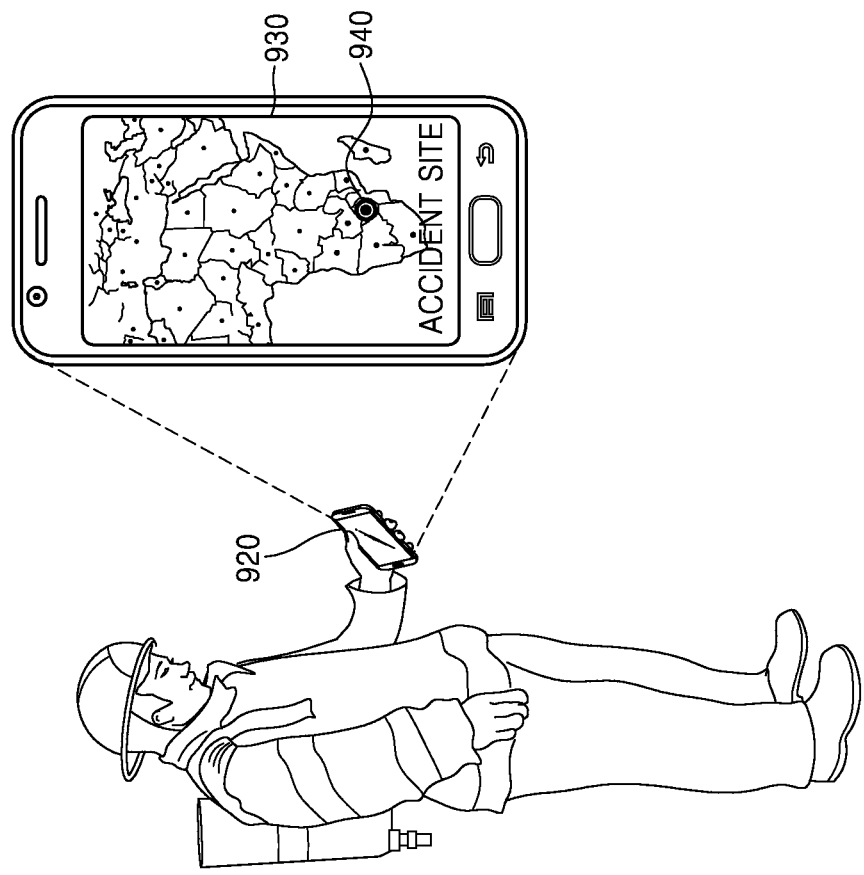
FIG. 9
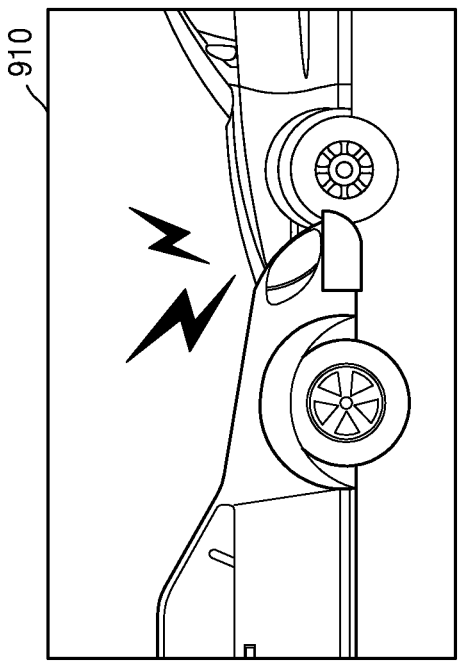

PORTABLE ELECTRONIC DEVICE AND OPERATING METHOD THEREFOR

CROSS-REFERENCE TO RELATED APPLICATIONS

This application is a Continuation Application of U.S. application Ser. No. 15/569,578, filed on Oct. 26, 2017, which is a national stage entry of International Patent Application No. PCT/KR2016/005435, filed on May 23, 2016, which claims priority from Korean Patent Application No. 10-2016-0060365, filed on May 17, 2016 in the Korean Intellectual Property Office, and Chinese Patent Application No. 201510308937.X, filed Jun. 8, 2015 in the State Intellectual Property Office of P. R. China, the disclosures of which are incorporated herein in their entirety by reference.

TECHNICAL FIELD

The present disclosure relates to a portable electronic device and a method of operating the same, and more particularly, to a portable electronic device related to a vehicle and a method of operating the same.

BACKGROUND ART

A frequency with which portable electronic devices are used in private vehicles is increasing. A user of a portable electronic device uses the portable electronic device in the vehicle, such as when making a call within the vehicle, when performing navigation, when sending a message, or when using a social network service (SNS). However, if the user uses the portable electronic device while driving, the user is more likely to be in danger.

DETAILED DESCRIPTION OF THE INVENTION

Technical Problem

Various embodiments may provide a portable electronic device that recognizes that a user is in a driving state so that the portable electronic device may automatically switch to a driving mode and provides a predetermined function based on switching to the driving mode and a method of operating the same.

Technical Solution

According to some embodiments of the present disclosure, a portable electronic device includes a sensor; and a controller configured to control the sensor, obtain motion information of the portable electronic device to detect a motion of at least a part of a user's arm, determine whether a user is in a driving state based on the obtained motion information, automatically switch the portable electronic device to a driving mode based on a result of the determining, and activate at least one function related to driving from among functions of the portable electronic device.

BRIEF DESCRIPTION OF THE DRAWINGS

FIG. 9 is a diagram of a crash alarm function according to an embodiment.

MODE OF THE INVENTION

Figure 1:
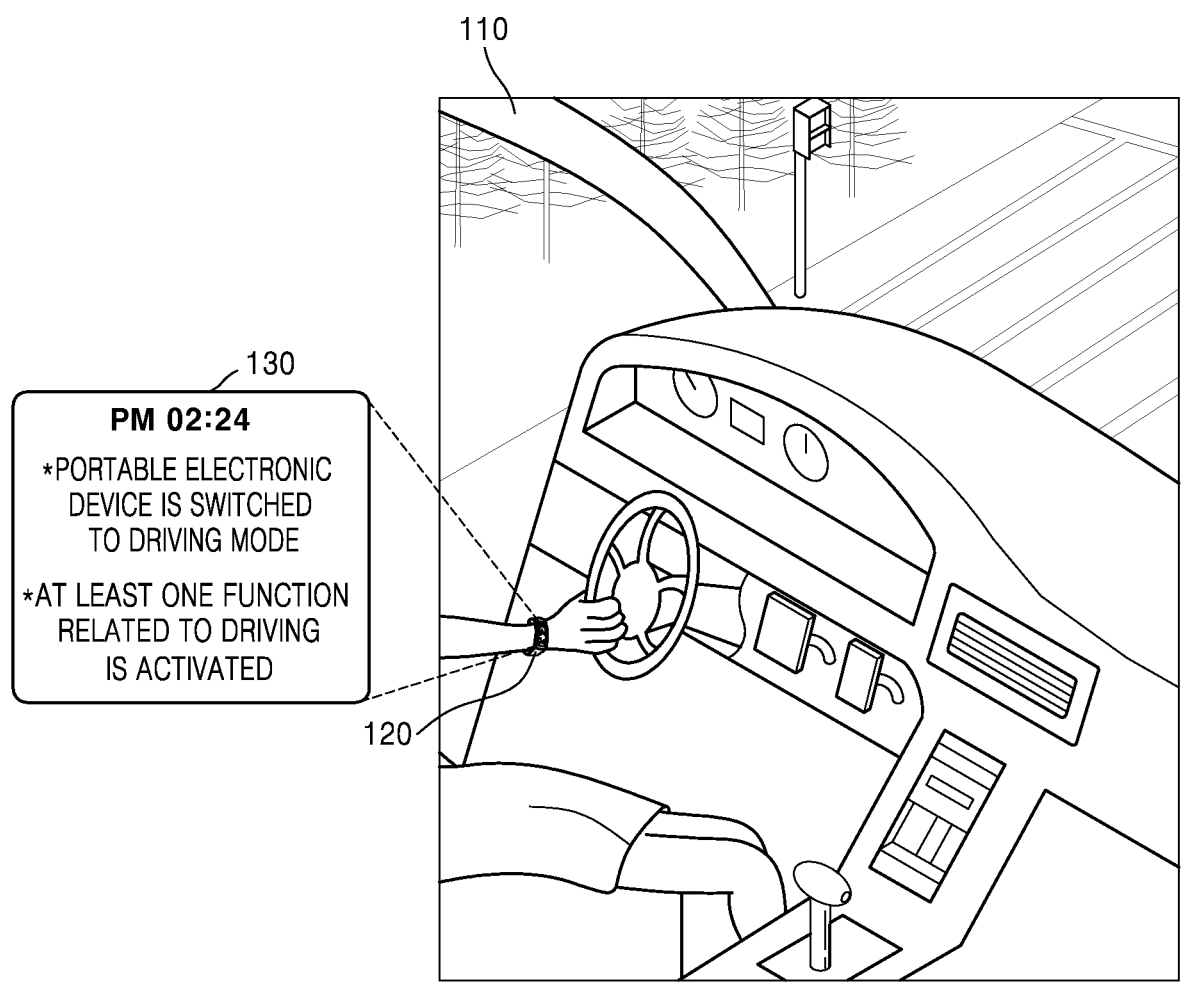
FIG. 1 is a diagram showing an example in which a portable electronic device operates, according to an embodiment.

According to some embodiments of the present disclosure, a portable electronic device includes a sensor; and a controller configured to control the sensor, obtain motion information of the portable electronic device to detect a motion of at least a part of a user's arm, determine whether a user is in a driving state based on the obtained motion information, automatically switch the portable electronic device to a driving mode based on a result of the determining, and activate at least one function related to driving from among functions of the portable electronic device.

The motion information may include at least one of an acceleration of the portable electronic device, a speed of the portable electronic device, and a velocity of the portable electronic device.

The controller may be further configured to determine that the user is in the driving state when a change in a sign of a vertical velocity of the portable electronic device occurs during a preset period of time more than a preset number of times and an average of a vertical speed of the portable electronic device is within a preset speed range during the preset period of time.

According to some embodiments of the present disclosure, a method of operating a portable electronic device includes obtaining motion information of the portable electronic device to detect a motion of at least a part of a user's arm; determining whether a user is in a driving state based on the obtained motion information; automatically switching the portable electronic device to a driving mode based on a result of the determining; and activating at least one function related to driving among functions of the portable electronic device based on the switching to the driving mode.

According to some embodiments of the present disclosure, there is provided a computer-readable recording medium having recorded thereon a program for implementing a method of operating a portable electronic device includes obtaining motion information of the portable electronic device to detect a motion of at least a part of a user's arm; determining whether a user is in a driving state based on the obtained motion information; automatically switching the portable electronic device to a driving mode based on a result of the determining; and activating at least one function related to driving among functions of the portable electronic device based on the switching to the driving mode.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

Hereinafter, embodiments of the present disclosure will be described in detail with reference to the accompanying drawings. However, the present disclosure may be embodied in many different forms and is not limited to the embodiments described herein. In order to clearly illustrate the present disclosure in the drawings, parts not related to the description are omitted, and like elements are denoted by like reference numerals throughout the specification.

Terms used in the specification may be used to describe various elements, but the elements should not be limited by the terms. Terms are used only for the purpose of distinguishing one element from another.

Throughout the specification, when a part is referred to as being "connected" to another part, it includes not only the case where it is "directly connected" but also the case where it is "electrically connected." Also, when a part is "connected" to another part, it includes a case where a part is in a state where data communication may be performed through signal transmission/reception with another part.

Also, when an element is referred to as "including" an element, it is to be understood that the element may include other elements as well, without departing from the spirit or scope of the present invention. Also, the terms "part", "module", and the like described in the specification refer to a unit for processing at least one function or operation, which may be implemented as hardware, software, or a combination of hardware and software.

The accompanying drawings may be schematically illustrated to describe an embodiment of the present disclosure, and some dimensions may be exaggerated for clarity. Similarly, substantial portions of the drawings may be arbitrarily represented.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. Also, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

Also, unless explicitly described to the contrary, the word "comprise" and variations such as "comprises" or "comprising" will be understood to imply the inclusion of stated elements but not the exclusion of any other elements. Also, the terms "-er", "-or", and "module" described in the specification mean units for processing at least one function and operation and may be implemented by hardware components or software components and combinations thereof.

Embodiments and accompanying drawings described in the present disclosure are intended to illustrate the present disclosure through some of various embodiments of the present disclosure and embodiments described in the present disclosure and the accompanying drawings are not intended to limit the present disclosure.

The "portable electronic device" used in embodiments of the present disclosure may include various smart user equipments, e.g. including, but not limited to, smart phones, tablet PCs, personal digital assistants, smart wearable apparatuses (e.g. smart glasses, smart watches, smart wristbands and so on) and so on.

In embodiments of the present disclosure, when the same user has a plurality of portable electronic devices, these portable electronic devices may set up communication connections. Different portable electronic devices may also have same or different sensors to collect different kinds of information.

For example, smart glasses may have cameras to capture images in a direction of a user's sight, while smart watches may have gyros and three-dimension acceleration sensors to sense the motion of the user's wrists.

In embodiments of the present disclosure, when a plurality of portable electronic devices of the same user set up communication connections, one of them acts as a master apparatus, and the others act as auxiliary apparatuses or associated apparatuses. Those skilled in the art may understand that the master apparatus may also be other smart apparatuses.

The term "user" used in embodiments of the present disclosure refers to a person who controls a portable electronic device.

Hereinafter, the present disclosure will be described in detail with reference to the accompanying drawings.

FIG. 1 is a diagram showing an example in which a portable electronic device operates, according to an embodiment.

A vehicle 110 shown in FIG. 1 is a vehicle, but this is merely an example, and a type of the vehicle 110 is not limited thereto. For example, the vehicle 110 may include cultivators, motorcycles, airplanes, ships, and the like.

In an embodiment, when at least one of a portable electronic device 120 and another associated device (not shown in FIG. 1) in the vehicle 110 detects a particular condition, the portable electronic device 120 may switch to a driving mode. Also, at least one function associated with driving of the portable electronic device 120 may be activated based on the portable electronic device 120 entering the driving mode. A specific description of the particular condition for switching the portable electronic device 120 to the driving mode will be described later with reference to FIGS. 3 and 4, and a detailed description of at least one function related to driving will be given in FIG. 9 later.

FIG. 1 shows an example of a screen 130 of the portable electronic device 120. A current time may be displayed on the screen 130 of the portable electronic device 120, a phrase indicating whether or not the portable electronic device 120 has been switched to the driving mode may be displayed thereon, and a phrase indicating whether at least one function related to driving has been activated may be displayed thereon.

However, the screen 130 of the portable electronic device 120 shown in FIG. 1 is merely an example, and screen of the portable electronic device 120 may be displayed in various ways to provide convenience to a user. For example, information about each of at least one function associated with driving may be specifically displayed, and horizontal acceleration of the portable electronic device 120, vertical velocity, etc. may be displayed.

Figure 2:
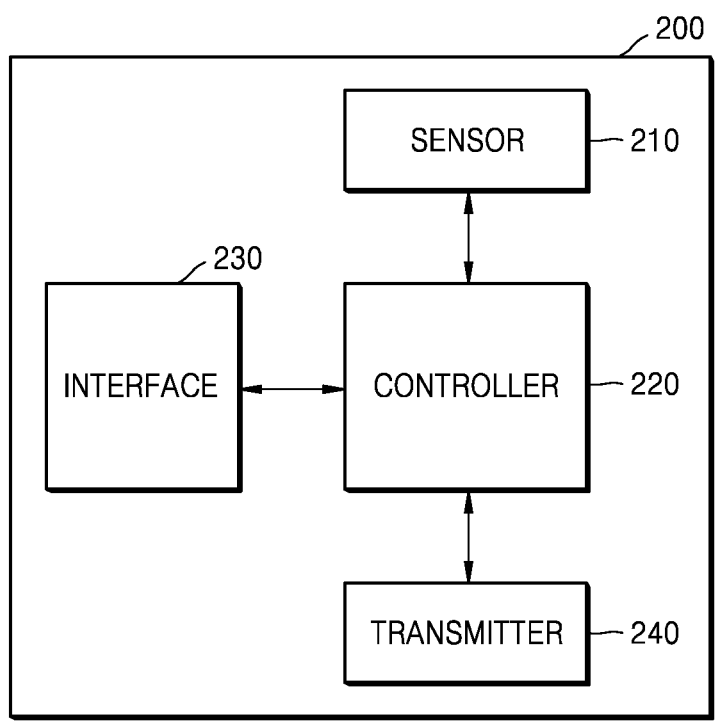
FIG. 2 is a block diagram showing a configuration of a portable electronic device according to an embodiment.

FIG. 2 is a block diagram showing a configuration of a portable electronic device according to an embodiment.

The portable electronic device 200 may include, for example, a sensor 210, a controller 220, an interface 230, and a transmitter 240.

The sensor 210 may, in an embodiment, sense information relating to at least one function related to a movement and driving of the portable electronic device 200.

In an embodiment, the sensor 210 may include a plurality of sensors for sensing different types of information. For example, the sensor 210 may include at least one of a gyro, a three-dimensional acceleration sensor, a camera, a pickup, an infrared sensor, a biosensor, a positioning module, an air sensor, and a light sensor.

In an embodiment, the gyro is a device used for a direction measurement in an inertial space of a high speed rotating body which is axially symmetric or for measurement of a rotational angular velocity with respect to the inertial space. The gyro may use angular momentum to sense angular movements when referencing an inertial space around one or more axes perpendicular to a spin axis.

In an embodiment, the three-dimensional acceleration sensor is also referred to as an accelerometer and may be used to detect three-dimensional acceleration. For example, a traveling direction of a vehicle is set as an X axis, a direction perpendicular to a horizontal plane is set as a Y axis, a direction perpendicular to the X axis and the Y axis is set as a Z axis, so that acceleration of the vehicle may be detected with respect to each axial direction. Also, the three-dimensional acceleration sensor may be used to detect a walking motion of a user when the user is outside the vehicle.

In an embodiment, the three-dimensional acceleration sensor may detect acceleration of the user or the vehicle by detecting acceleration of the portable electronic device 200.

In an embodiment, when the portable electronic device 200 is worn on the wrist, the portable electronic device 200 may use at least one of the gyro and the three-dimensional acceleration sensor to sense a circular movement of the user's wrist while the user is operating a steering wheel of the vehicle.

In an embodiment, the pickup may be used to collect audio information, such as external audio information, i.e., engine sound of the vehicle.

In an embodiment, the infrared sensor may be used to collect information such as infrared information of external radiation, i.e., infrared emission information of a vehicle engine.

In an embodiment, the biosensor is a device which is sensitive to biological substances and may be used to collect information about various physiological parameters of a user's body. The information about physiological parameters includes, for example, heart rate, blood pressure, blood oxygen saturation, body temperature, respiration, etc., and a type of the information about physiological parameters is not limited thereto.

In an embodiment, when the user wears the portable electronic device 200 on the user's wrist, the biosensor of the portable electronic device 200 may be attached to the user's skin to sense various physiological parameters of the user.

In an embodiment, the positioning module may be used to detect a position of the portable electronic device 200. The positioning module may also be used to measure at least one of a speed and a velocity of the portable electronic device 200. The speed or the velocity of the portable electronic device 200 may be calculated based on position information of the portable electronic device 200 collected over a certain period of time.

For example, as shown in FIG. 1, when the portable electronic device 200 is a smart watch, a positioning module of the smart watch may collect position information of the smart watch so that at least one of a velocity and a speed for each time may be detected. When a vertical position of the wrist is lowered or raised while the user turns the steering wheel, at least one of a vertical velocity and speed of the smart wristwatch worn by the user's wrist for each time may be detected.

In an embodiment, the positioning module may be a global positioning system (GPS) receiver, but a type of the positioning module is not limited thereto.

In an embodiment, the air sensor may acquire composition information of air around the portable electronic device 200. The air sensor may be an alcohol sensor sensitive to an alcohol composition of the air.

In an embodiment, instead of the sensors or additionally, the sensor 210 may include other types of sensors. For example, the sensor 210 may include a humidity sensor, an atmospheric pressure sensor, and the like. The humidity sensor may be used to sense humidity to determine an ambient environment, such as a weather condition. The atmospheric pressure sensor may also be used to sense atmospheric pressure to determine the ambient environment, i.e. the weather condition, and the like.

The controller 220 may, in an embodiment, control the sensor 210 to obtain motion information of the portable electronic device 200 to detect a movement of at least a part of a user's arm.

In an embodiment, the controller 220 may determine whether the user is in a driving state based on the motion information of the portable electronic device 200.

In an embodiment, the motion information of the portable electronic device 200 may include at least one of acceleration of the portable electronic device 200, speed of the portable electronic device 200, and velocity of the portable electronic device 200.

A specific method of determining whether or not a user is in the driving state will be described later with reference to FIGS. 3 and 4.

The controller 220, in an embodiment, may automatically switch the portable electronic device 200 to a driving mode based on determination that the user is in the driving state.

The controller 220, in an embodiment, may activate at least one function associated with driving of functions of the portable electronic device 200 based on switching to the driving mode.

Specific examples of at least one function related to driving will be described later in descriptions of FIGS. 5 to 9.

The interface 230 may, in an embodiment, obtain at least one of internal image information and external image information of the vehicle in which the user is located. The interface 230 may acquire image information from, for example, a camera included in an external device. Alternatively, the interface 230 may obtain image information from a camera embedded in the portable electronic device 200.

In an embodiment, the interface 230 may be used to collect image information including static images and dynamic images (e.g., video). The image information may include at least one of the internal image information of the vehicle (including image information relating to the user) and the external image information (an image of a front direction of the vehicle, an image of a side direction of the vehicle, and an image of a rear direction of the vehicle, and the like).

In an embodiment, the interface 230 may obtain information about illuminance around the vehicle. For example, the information about the illuminance around the vehicle may be received from sensors located outside the vehicle.

When the controller 220 determines that a collision accident has occurred in the vehicle in which the user is located in an embodiment, the transmitter 240 may automatically transmit collision accident occurrence information to a designated contact based on determination that the collision accident has occurred. A detailed description will be given later with reference to FIG. 8.

Meanwhile, the block diagram of the portable electronic device 200 shown in FIG. 2 is a block diagram for an embodiment. Each component of the block diagram may be integrated, added, or omitted according to specifications of the portable electronic device 200 actually implemented. That is, two or more components may be combined into one component as needed, or one component may be divided into two or more components.

Also, functions performed in each block are intended to explain embodiments, and specific operations or apparatuses do not limit the scope of the present disclosure.

Figure 3:
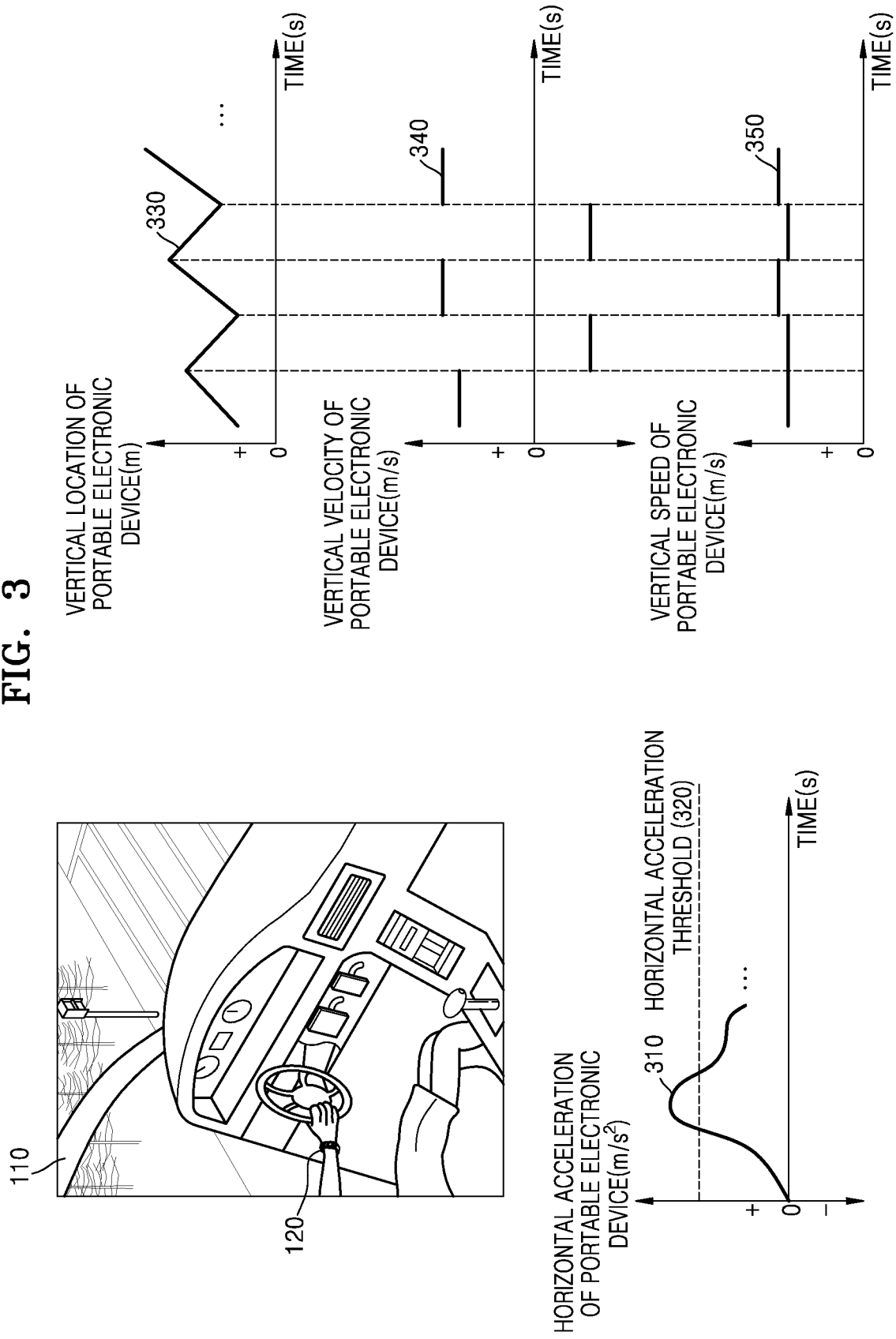
FIG. 3 is a diagram for explaining a method of determining whether a user is in a driving state, according to an embodiment.

FIG. 3 is a diagram for explaining a method of determining whether a user is in a driving state according to an embodiment.

In an embodiment, the portable electronic device 120 may determine that the user is in the driving state when a horizontal acceleration 310 of the portable electronic device 120 exceeds a preset horizontal acceleration threshold 320.

More specifically, when the user boards on and departs from a vehicle, the vehicle may generate acceleration in a horizontal direction. The horizontal acceleration 310 of the portable electronic device 120 in the vehicle may be equal to the horizontal acceleration of the vehicle.

In an embodiment, the portable electronic device 120 may determine that the user in the driving state when a change in a sign of a vertical velocity 340 of the portable electronic device 120 occurs more than a preset number of times during a preset period of time, and an average of a vertical speed 350 of portable electronic device 120 is within a preset speed range during the preset period of time.

More specifically, when the user manipulates a steering wheel of a vehicle 110, a vertical position (330) of a user's wrist and the portable electronic device 120 worn on the wrist may be changed. A sign of the vertical velocity 340 may be minus when the vertical position 330 of the portable electronic device 120 falls. The sign of the vertical velocity 340 may be plus when the vertical position 330 of the portable electronic device 120 rises.

Thus, when the user moves the wrist in a circular motion while manipulating the steering wheel, the vertical position 330 of the portable electronic device 120 may change, and thus the sign of the vertical velocity 340 of the portable electronic device 120 may change. The portable electronic device 120 may determine that the user is in the driving state when a condition that the change in the sign of the vertical velocity 340 of the portable electronic device 120 occurs for a preset period of time more than a preset number of times is satisfied.

Also, if the average of the vertical speed 350 of the portable electronic device 120 is within the preset speed range during the preset period of time, the portable electronic device 120 may determined that the user is in the driving state. In this regard, the preset speed range may be determined based on accumulated averages of vertical speeds of the stored portable electronic device 120.

For example, in a multi-year statistical survey, if an average vertical speed of a driver's wrist during a preset period of time while driving is greater than 80 percent within 2 cm/s to 5 cm/s, the preset speed range may be 2 cm/s to 5 cm/s.

The portable electronic device 120 may, in an embodiment, automatically switch the portable electronic device 120 to a driving mode based on determination that the user is in the driving state.

Figure 4:
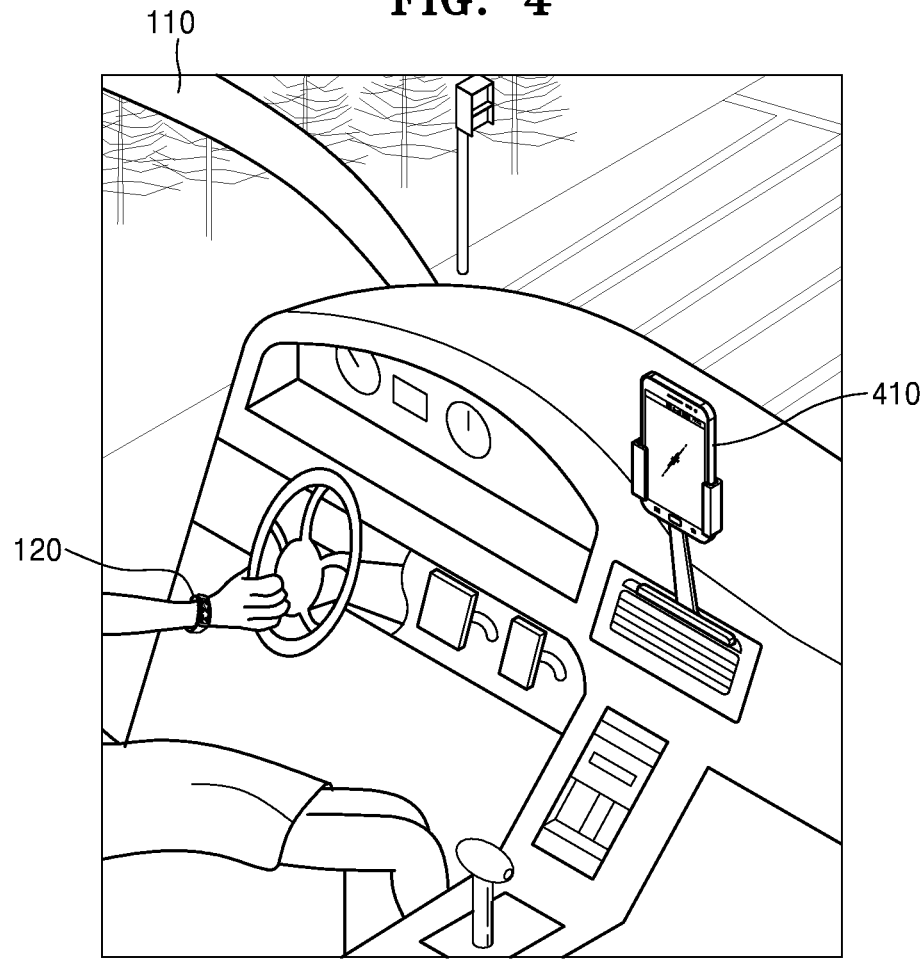
FIG. 4 is a diagram for explaining a method of determining whether or not a user is in a driving state, according to an embodiment.

FIG. 4 is a diagram for explaining a method of determining whether or not a user is in a driving state according to an embodiment.

In an embodiment, the portable electronic device 120 shown in FIG. 4 serves as a master device and another portable electronic device 410 serves as an associated device.

The portable electronic device 120, in an embodiment, may obtain internal image information and external image information of a vehicle in which the user is located. More particularly, the portable electronic device 120, which acts as the master device, may directly acquire the internal image information and the external image information or may receive internal image information and external image information obtained by the portable electronic device 410, which acts as the associated device.

The portable electronic device 120 may determine whether the user is in the driving state based on the obtained internal image information and external image information in an embodiment.

More specifically, the portable electronic device 120 may determine whether a steering wheel of the vehicle is within a preset range in front of the user based on the internal image information and determine whether the vehicle is moving based on the external image information. If it is determined that the steering wheel of the vehicle is within the present range in front of the user and the vehicle is moving, the portable electronic device 120 may determine that the user is in the driving state.

Figure 5:
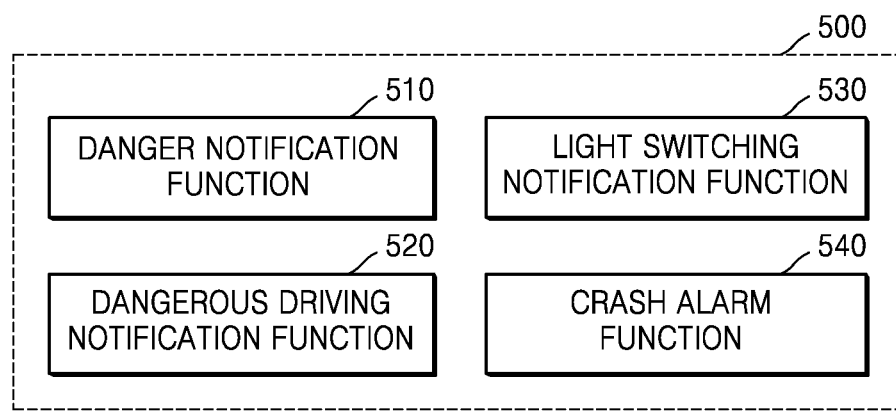
FIG. 5 is a diagram illustrating examples of at least one function associated with driving, according to an embodiment.

FIG. 5 is a diagram illustrating examples of at least one function associated with driving according to an embodiment.

As shown in FIG. 5, at least one function 500 associated with driving may include at least one of a danger notification function 510, a dangerous driving notification function 520, a light switching notification function 530, and a crash alarm function 540. A type of the at least one function 500 associated with driving is not limited thereto.

In an embodiment, after the portable electronic device 120 is switched to a driving mode, the portable electronic device 120 may receive a response from the user as to whether to activate at least one of the at least one function 500 associated with driving. The portable electronic device 120 may determine whether to activate at least one of the at least one function 500 associated with driving based on the response received from the user.

Alternatively, the portable electronic device 120 may be set to activate at least one of the at least one function 500 associated with driving of the portable electronic device 120 automatically after the portable electronic device 120 is switched to the driving mode.

Figure 6:
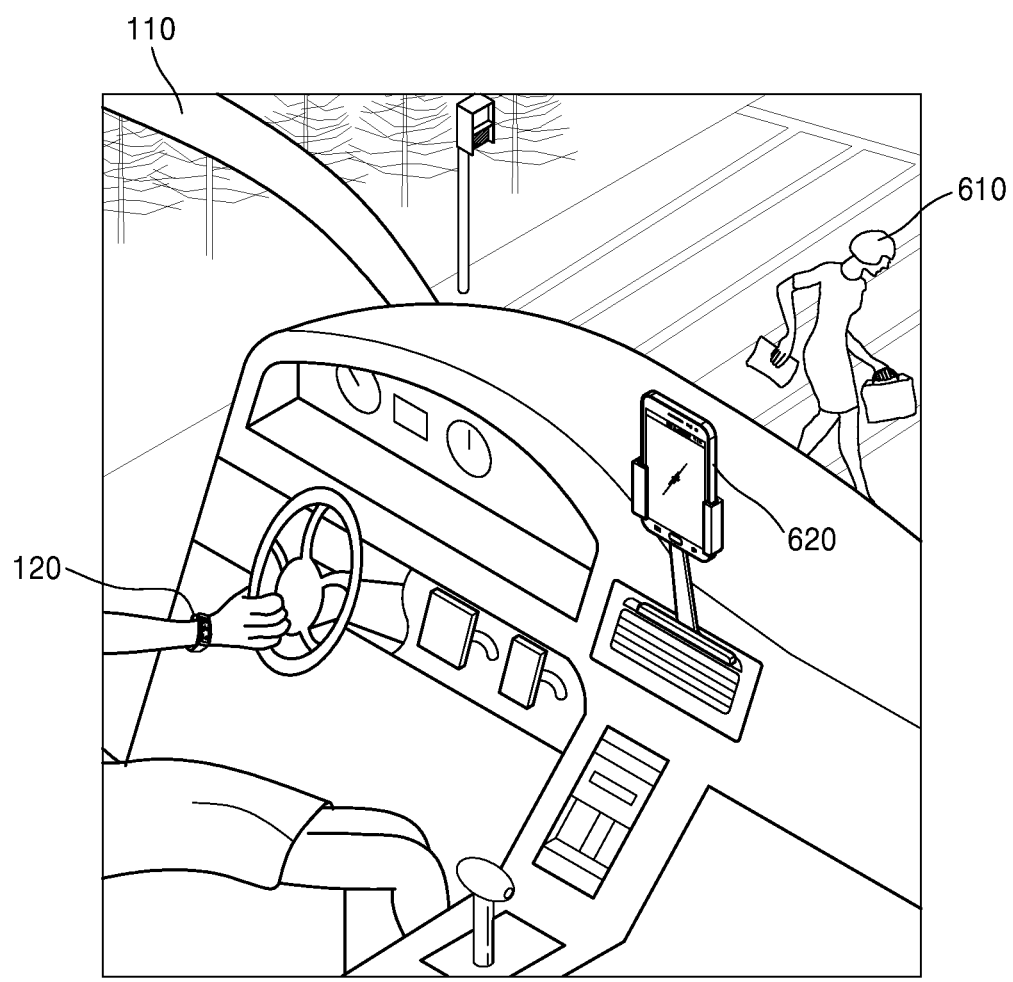
FIG. 6 is a diagram of a danger notification function according to an embodiment.

FIG. 6 is a diagram of the danger notification function 510 according to an embodiment.

In an embodiment, the portable electronic device 120 may detect a danger factor in external image information.

In an embodiment, when the danger notification function 510 is activated, the portable electronic device 120 may determine if there is the danger factor through the external image information of the vehicle 110. The external image information of the vehicle 110 may be obtained via the portable electronic device 120 or may be acquired by an associated device 620 and then transmitted to the portable electronic device 120.

For example, if the portable electronic device 120 is a smart phone, the smart phone may be secured to a cell-phone holder attached to a car windshield to acquire the external image information of the vehicle 110 with a rear camera and may acquire internal image information of the vehicle 110 with a front camera.

For example, if the portable electronic device 120 is a smart watch, the associated device 620, such as smart glasses, smart phones, etc., may obtain the external image information of the vehicle 110. The information obtained by the associated device 620 may be transmitted to the smart watch.

In an embodiment, the danger factor may include a road sign warning of danger. The portable electronic device 120 may detect whether the acquired external image information of the vehicle 110 includes the road sign warning of the danger.

In an embodiment, the danger factor may include a pedestrian 610 walking on the road on a red signal. The portable electronic device 120 may detect information that the pedestrian 610 is walking a crosswalk on the red signal from the obtained external image information of the vehicle 110.

When the pedestrian 610 who is walking on the road is detected from the external image information of the vehicle 110 while start acceleration of the vehicle 110 is detected, the portable electronic device 120 may determine that the danger factor has been detected.

In an embodiment, detection of persons and other danger factors may be through image comparison. A basic principle of image comparison is to compare similarity of an acquired image with a previously stored reference image to determine if a previously determined object exists.

With respect to image comparison, image comparison exclusive software such as image comparison software or tool-mark image automatic identification software may be used. The image comparison exclusive software may use ripe linear detection algorithm of images, may use image matching techniques, compare images through composition of images and textures, and may statistically approach to evaluate similarities between images. The present disclosure may be performed through various image comparison techniques, but is not limited thereto.

The portable electronic device 120 may, in an embodiment, notify the user of the danger factor based on the detection of the danger factor. A method of notifying the danger factor may be set according to a user preference, for example, but not limited to, at least one of a visual method, an auditory method, and a tactile method. Notification content may include images, letters, sounds, or a combination thereof.

As an example, if the danger factor is detected, the portable electronic device 120 may display text indicating that the danger factor has been detected or an image associated with the danger factor on a screen of the portable electronic device 120.

As another example, if the danger factor is detected, portable electronic device 120 may tactually notify the user through vibration, and at the same time may notify the user by voice that the danger factor has been detected.

In an embodiment, in order to conserve power consumption of the portable electronic device 120, the portable electronic device 120 may be set not to detect a pedestrian from the external image information after the vehicle 110 has started to travel stably. For example, the portable electronic device 120 may be set not to detect the pedestrian from the external image information based on the fact that horizontal acceleration of the vehicle 110 is less than a preset acceleration threshold.

Figure 7A:
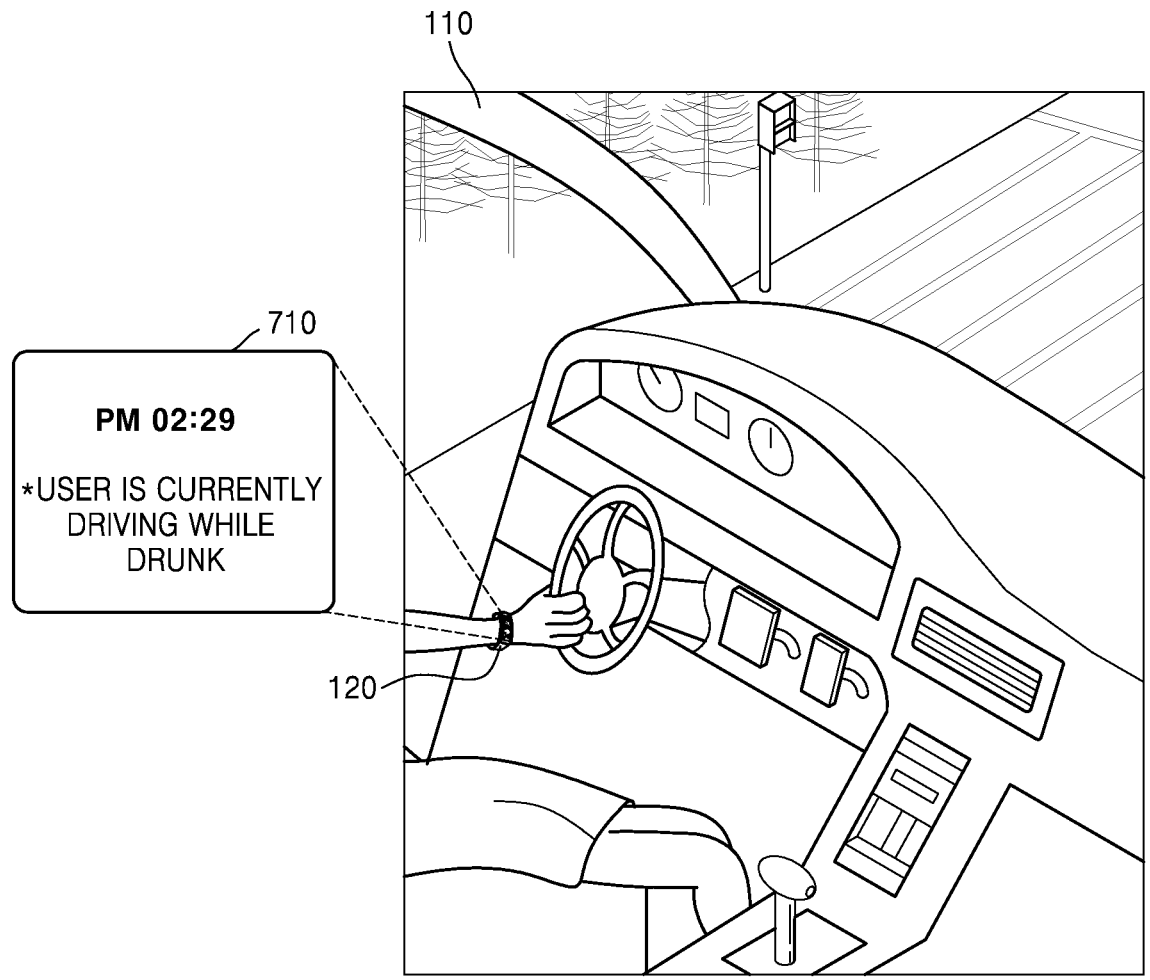
FIGS. 7A and 7B are diagrams illustrating a dangerous driving notification function according to an embodiment.
Figure 7A:
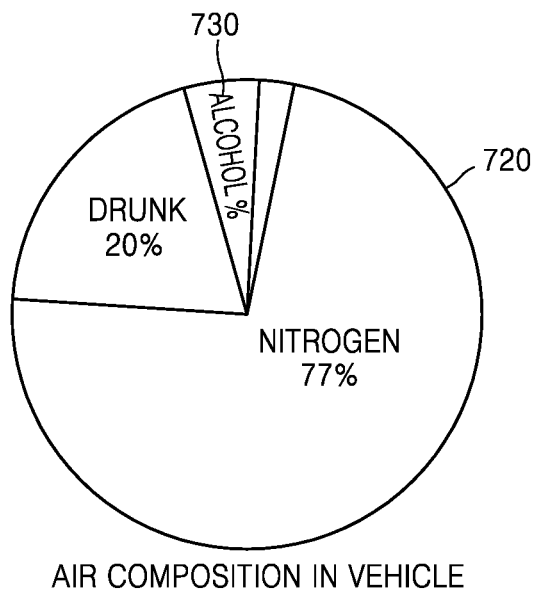
Figure 7B:
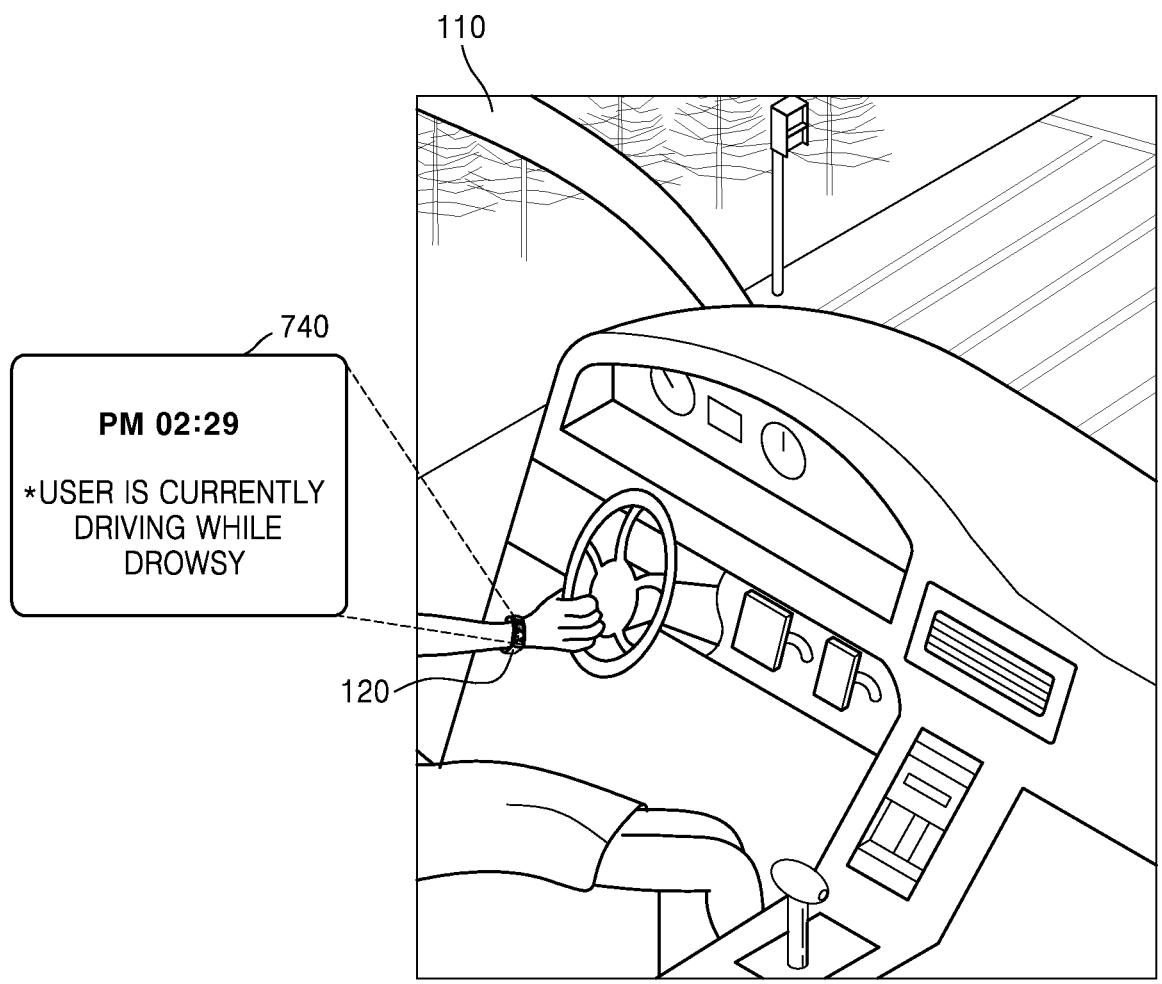

FIGS. 7A and 7B are diagrams illustrating the dangerous driving notification function 520 according to an embodiment.

In an embodiment, the dangerous driving notification function 520 may include at least one of a drunk driving notification function and a drowsy driving notification function.

FIG. 7A is a diagram illustrating the drunk driving notification function according to an embodiment.

The portable electronic device 120 may obtain component information 720 of the air around the portable electronic device 120. FIG. 7A shows an example of the component information 720 of the air around the portable electronic device 120.

In an embodiment, if a percentage 730 of an alcohol component in the air around the portable electronic device 120 exceeds a preset percentage, the portable electronic device 120 may determine that a user is under drunk driving.

The portable electronic device 120 may notify the user that the user is under drunk driving based on the obtained component information 720 of the air around the portable electronic device in an embodiment.

For example, on a screen 710 of the portable electronic device, as shown in FIG. 7A, the "user is currently driving while drunk" may be displayed and at the same time the portable electronic device 120 may vibrate. A method of notifying that the user is under drunk driving may be the same as the method of notifying a danger factor described above with reference to FIG. 6, and thus a more detailed description thereof will be omitted.

FIG. 7B is a diagram illustrating a drowsy driving notification function according to an embodiment.

The portable electronic device 120 may obtain a vertical velocity of the portable electronic device 120 in an embodiment.

In an embodiment, the user may not operate a steering wheel for more than a predetermined time when the user is asleep compared to a normal driving condition. Whether the user operates the steering wheel may be detected from motion information of the portable electronic device 120 worn on a user's wrist. In other words, whether the user operates the steering wheel may be detected from the vertical velocity of the portable electronic device 120.

When a condition that a change in a sign of the vertical velocity of the portable electronic device 120 occurs less than a preset number of times during a preset period of time is satisfied in an embodiment, the portable electronic device 120 may notify the user that the user drives while drowsy.

For example, on a screen 740 of the portable electronic device, as shown in FIG. 7A, the "user is currently driving while drowsy" may be displayed and the portable electronic device 120 may vibrate at the same time. A method of notifying the user of drowsy driving may be the same as a method of notifying a danger factor described above with reference to FIG. 6, and thus a more detailed description thereof will be omitted.

Also, the portable electronic device 120 may sense a motion trace of the user's wrist. For example, if the portable electronic device 120 is a wearable device worn on the wearer's wrist, the portable electronic device 120 may sense the motion trace of the user's wrist by sensing a motion trace of the portable electronic device 120.

In another example, if the portable electronic device 120 is not a device worn on the wearer's wrist, a sensor may be attached to the user's wrist, and the portable electronic device 120 may detect the motion trace of the user's wrist by sensing a motion trace of the sensor.

If a clockwise circular motion or a counterclockwise circular motion of the user's wrist is not detected for a certain period of time, it may be determined that the user is driving while drowsy in a state where the user does not operate the steering wheel.

In an embodiment, other methods of monitoring the user to assist in determining whether the user drives while drowsy may also be realized. For example, other monitoring methods may include at least one of blood pressure detection of the user, heart rate detection, pulse signal detection, facial image capturing, facial feature analysis, eye image capturing, and eye condition analysis.

Figure 8:
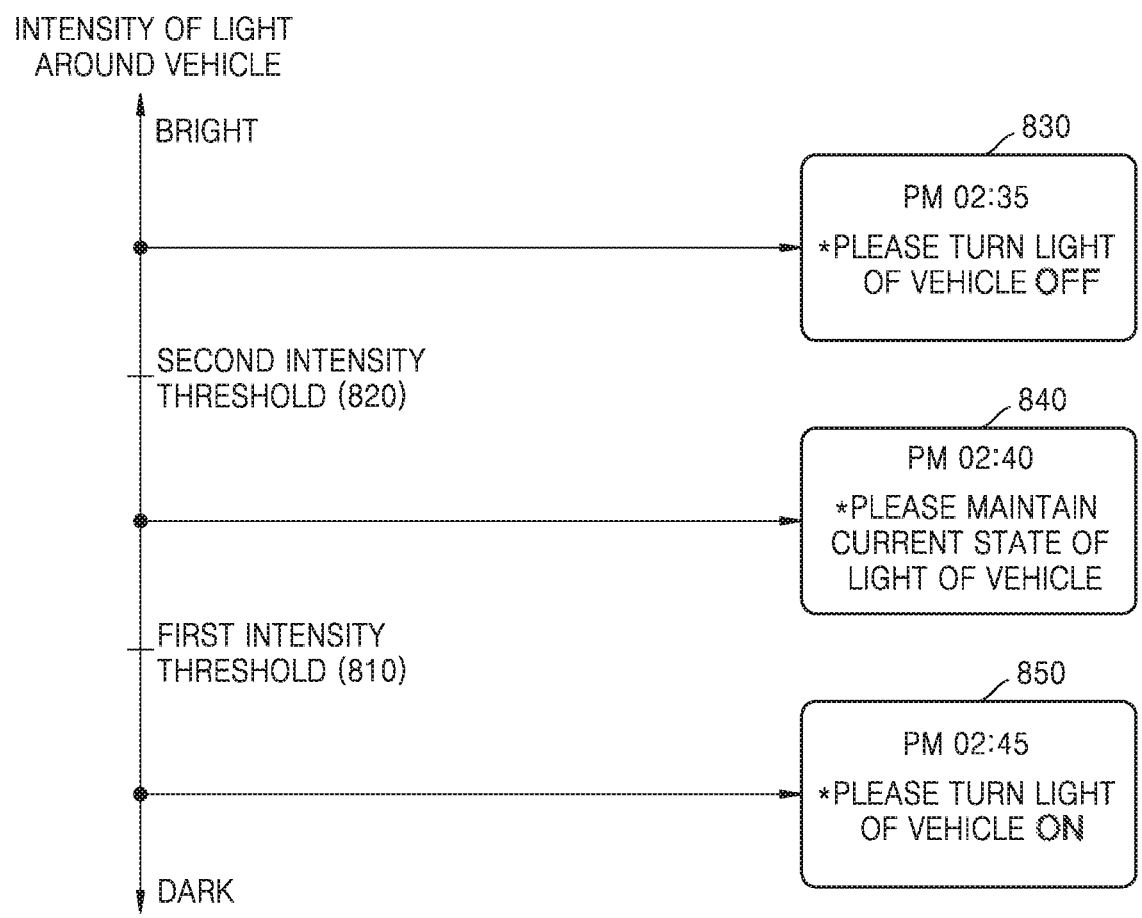
FIG. 8 is a diagram of a light switching notification function according to an embodiment.

FIG. 8 is a diagram of an illumination switching notification function according to an embodiment.

The portable electronic device 120 may acquire information about intensity of illumination around the vehicle 110. More specifically, an illuminance sensor (e.g., a photoresistor) of the portable electronic device 120 may sense the intensity of illumination around the vehicle 110.

Alternatively, the portable electronic device 120, and more particularly, the interface 230 of the portable electronic device, may receive the information about the intensity of illumination around the vehicle 110 acquired by a sensor (not shown in FIG. 8) outside the vehicle 110.

In an embodiment, when the illumination switching notification function is activated, the portable electronic device 120 may automatically alert 830, 850 that a user turns the light on or off. For example, if the sky gets dark during driving, and the user reruns after stopping the vehicle 110 at night, the user may forget to turn on the headlights due to reasons such as where a departure place is bright. At this time, a collision accident may easily occur. To prevent an accident, the illumination switching notification function may automatically alert 830 the user to turn on the light.

In an embodiment, the illumination switching notification function may be automatically activated after the portable electronic device 120 enters a driving mode, and may be set such that an activation state is maintained in the driving mode.

In an embodiment, a prompting message may be provided to alert the user to turn on or off the light, depending on a preset time associated with turning the light on or off. The preset time associated with turning on or off the light may be determined based on an illuminance condition of each season, spring, summer, autumn and winter.

Also, the illuminance condition may be changed depending on a trajectory of sunlight. For example, in a northern hemisphere, the summer solstice is that the day is the longest and the night is the shortest of the year, and the day and night lengths of spring equinox and spring equinox may be the same. Therefore, a period of turning on and off the light may be set differently depending on the trajectory of the sunlight, that is, the illuminance condition.

In an embodiment, a method of alerting the user to turn the light on or off may be set according to user's preferences, for example, but not limited to, a visual method, an auditory method, and a tactile method. Alert content may include images, letters, sounds, or a combination thereof.

In an embodiment, if the intensity of illuminance around the vehicle 110 is less than a first intensity threshold 810, i.e., if surroundings of the vehicle 110 are dark, the portable electronic device 120 may alert 850 the user to turn on the light. Also, if the intensity of illuminance around the vehicle 110 is greater than a second intensity threshold 820, i.e., if the surroundings of the vehicle 110 are bright, the portable electronic device 120 may alert 830 the user to turn off the light.

In an embodiment, a time delay circuit may be added to a specific circuit structure of the portable electronic device 120 to prevent an entry of the driving mode and a termination of the driving mode from occurring more frequently than necessary due to frequent variations in illuminance. By using the time delay circuit, the portable electronic device 120 may alert 830, 850 the user to turn on the light only when the intensity of illuminance around the vehicle 110 is less than the first intensity threshold 810 for a certain period of time, and to turn off the light only when the intensity of illuminance around the vehicle 110 is greater than the second intensity threshold 820 for a certain period of time.

In an embodiment, if the intensity of illuminance around the vehicle 110 is appropriate, i.e., if the intensity of illuminance around the vehicle 110 is between the first intensity threshold 810 and the second intensity threshold 820, the portable electronic device 120 may display 840 a phrase informing the user to maintain a current illumination condition on a screen of the portable electronic device 120.

FIG. 9 is a diagram of a crash alarm function according to an embodiment.

The portable electronic device 120 may obtain horizontal acceleration of the portable electronic device 120 in an embodiment. More specifically, the sensor 210 of the portable electronic device 120 may obtain the horizontal acceleration of the portable electronic device 120.

The portable electronic device 120 may determine whether a crash accident has occurred 910 with a vehicle in which the user is located. More specifically, the portable electronic device 120 may determine that the crash accident has occurred 910 if the horizontal acceleration of the portable electronic device 120 is less than preset negative acceleration.

In an embodiment, when the crash accident occurs 910, the vehicle may generate strong negative acceleration for about 0.1 second. Conditions of three crash tests with respect to acceleration may be as follows.

First of the three crash test conditions is a 100% overlapping strong crash test in front of a wall. A crash velocity specified in the China New Car Assessment Program (C-NCAP) is 50 km/h. A crash velocity specified by NHTSA-NCAP is 56 km/h. A crash velocity specified by Japan J-NCAP is 55 km/h.

Second of the three crash test conditions may be a 40% overlapping deformation collision test in front of the wall. A crash velocity specified in C-NCAP is 64 km/h. A crash velocity specified in European E-NCAP is 64 km/h. A crash velocity specified in Japan J-NCAP is 64 km/h.

Third of the three crash test conditions is a crash test that may be deformed and moved on a wall side. A crash velocity specified in C-NCAP is 50 km/h.

In an embodiment, by analyzing the three crash test conditions, the lowest crash velocity may be 50 km/h, i.e. 13.9 m/s, and a crash time may be assumed to be 0.1 second.

At this time, acceleration a (an acceleration threshold) at the time of the crash may be obtained as follows: a=13.9/0.1/g14 g, g=9.8 m/s².

In an embodiment, a theoretically calculated acceleration threshold may be set to a crash acceleration threshold to be a reference for whether an accident has occurred. For example, if the acceleration of the vehicle is detected to be less than the theoretically calculated acceleration threshold of −14 g (a sign of acceleration is negative and magnitude of acceleration is greater than 14 g), the portable electronic device 120 may determine that the crash accident has occurred.

The portable electronic device 120 may automatically transmit crash accident information to a designated contact based on determination that the crash accident has occurred in an embodiment. The designated contact may include an emergency contact. Also, the crash accident information may include important information (e.g., geographical location of an accident site, etc.).

In an embodiment, a method of contacting the emergency contact may vary. For example, a phone number of the emergency contact may be automatically dialed, or information about the crash accident may be automatically sent to the emergency contact. Also, content of the information transmitted to the emergency contact may include a network link to crash accident occurrence location information.

For example, when the crash accident occurs 910 as shown in FIG. 9, crash accident occurrence information (for example, an accident site map 930) may be transmitted to a terminal 920 of the other party designated as the emergency contact and may be displayed on the terminal 920 of the other party. The other party (for example, emergency rescue staff) may identify a location 940 of an accident site and refer to the location in coping with an emergency situation.

In an embodiment, a positioning module in the sensor 210 of the portable electronic device 110 may be used to obtain information regarding a geographic location of the accident site where the crash accident occurred. The information about the geographical location of the accident site where the crash accident occurred may include at least one of a map and a figure associated with the location of the crash accident.

In an embodiment, the map associated with the location of the crash accident may be represented, for example, via a map application. When the map application is executed, a current geographical location and the geographical location of the accident site where the crash accident occurred may be displayed within the map.

In an embodiment, if it is determined that the crash accident has occurred 910, the user may set the portable electronic device 120 to activate an alert process immediately or within a predetermined time (e.g., one minute) to activate the alert process.

Also, if it is determined that the crash accident has occurred 910, the portable electronic device 120 may be set to forward an alert message to the user and allow the user to operate an "off" key. For example, if the user operates "off", the crash accident occurrence information (e.g., location information of the accident) may be recorded in the portable electronic device 120, and may not be transmitted to the emergency contact. If the user does not operate "off", the alarm process may be activated and the crash accident occurrence information may be transmitted to the emergency contact.

In an embodiment, the crash accident occurrence information may include at least one of video information and photograph information including a crash accident scene.

The user may obtain information related to the accident scene from the portable electronic device 120. For example, the user may receive video, photos, etc. related to the accident scene from a cloud server.

Figure 10:
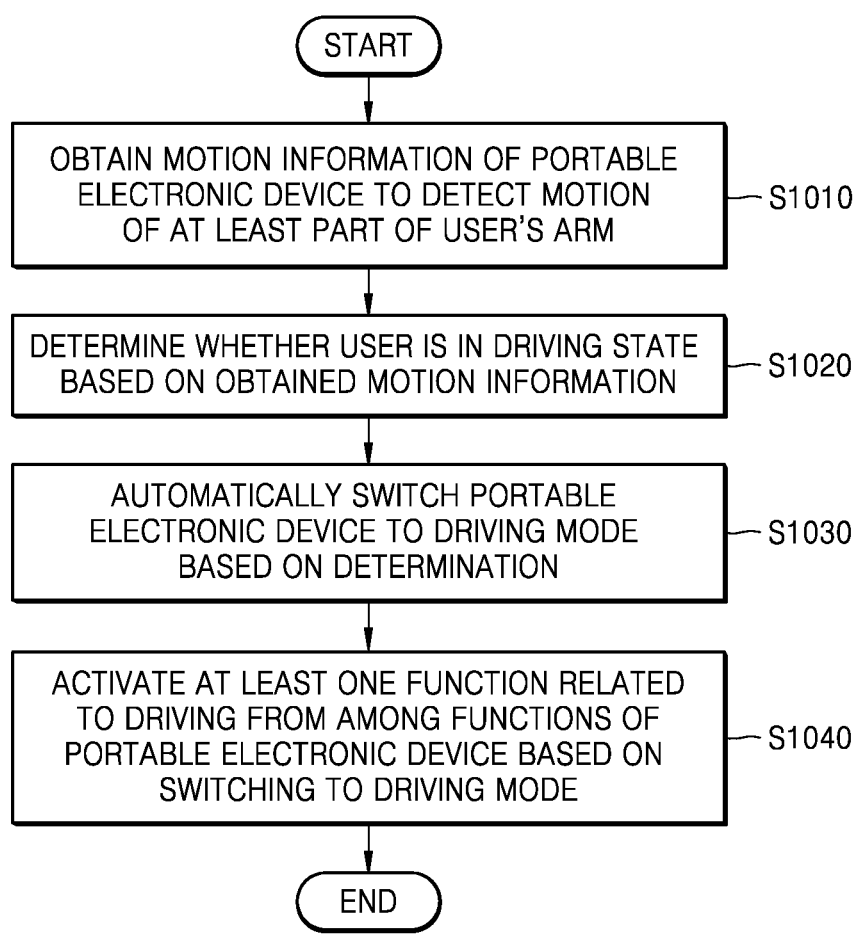
FIG. 10 is a flowchart of a method of operating a portable electronic device, according to an embodiment.

FIG. 10 is a flowchart of a method of operating a portable electronic device according to an embodiment.

Since steps 1010 to 1030 are performed by operations of each component of the portable electronic device 120, descriptions and contents of FIGS. 1 to 9 may be redundant. Therefore, for simplicity of description, a detailed description of redundant contents will be omitted.

In step 1010, the portable electronic device 120 may obtain motion information of the portable electronic device 120 to detect movement of at least a part of a user's arm.

In an embodiment, the motion information of the portable electronic device 120 may include at least one of an acceleration of the portable electronic device 120, a speed of the portable electronic device 120, and a velocity of the portable electronic device 120.

In step 1020, the portable electronic device 120 may determine whether a user is in a driving state based on the obtained motion information.

In an embodiment, the motion information of the portable electronic device 120 may include at least one of the acceleration of the portable electronic device 120, the speed of the portable electronic device 120, and the velocity of the portable electronic device 120.

In an embodiment, the portable electronic device 120 may determine whether the user is in the driving state based on the motion information of the portable electronic device 120.

In an embodiment, the portable electronic device 120 may determine that the user is in the driving state when the horizontal acceleration 310 of the portable electronic device 120 exceeds the preset horizontal acceleration threshold 320.

In an embodiment, the portable electronic device 120 may determine that the user is in the driving state when a change in a sign of the vertical velocity 340 of the portable electronic device 120 occurs during a preset period of time more than a preset number of times and an average of the vertical speed 350 of the portable electronic device 120 is within a preset speed range during the preset period of time.

In an embodiment, based on internal image information of a vehicle on which the user is boarding, the portable electronic device 120 may determine whether a steering wheel of the vehicle is within a preset range of a user front. Also, the portable electronic device 120 may determine whether the vehicle is moving based on external image information of the vehicle. If it is determined that the steering wheel of the vehicle is within the preset range of the user front and the vehicle is moving, the portable electronic device 120 may determine that the user is in the driving state.

In step 1030, the portable electronic device 120 may automatically switch the portable electronic device 120 to a driving mode based on determination.

In step 1040, the portable electronic device 120 may activate at least one function associated with driving of functions of the portable electronic device 120 based on switching to the driving mode.

In an embodiment, the at least one function 500 associated with driving may include at least one of the danger notification function 510, the dangerous driving notification function 520, the illumination switching notification function 530, and the crash alarm function 540. A type of the at least one function 500 associated with driving is not limited thereto.

With regard to the danger notification function 510, in an embodiment, the portable electronic device 120 may detect a danger factor in external image information of the vehicle in which the user is located. Also, the portable electronic device 120 may notify the user of the danger factor based on detection of the danger factor.

With respect to the dangerous driving notification function 520, in an embodiment, the portable electronic device 120 may obtain the component information 720 of the air around the portable electronic device 120. Further, the portable electronic device 120 may notify the user of dangerous driving based on the acquired component information 720 of the air around the portable electronic device 120. The portable electronic device 120 may determine that the user is driving dangerously if the percentage 730 of an alcohol component in the component information 720 of the air around the portable electronic device 120 exceeds a preset percentage.

In connection with the illumination switching notification function 530, in an embodiment, the portable electronic device 120 may obtain information about intensity of illuminance around the vehicle 110. Alternatively, the portable electronic device 120, and more particularly the interface 230 of the portable electronic device 120, may receive information about the intensity of illuminance around the vehicle 110 that a sensor outside the vehicle 110 acquires. The portable electronic device 120 may automatically alert 830, 850 that the user turns the light on or off based on the acquired information about the intensity of illuminance.

With respect to the crash alarm function 540, in an embodiment, the portable electronic device 120 may determine whether a crash accident has occurred 910 on the vehicle in which the user is located. The portable electronic device 120 may determine that the crash accident has occurred 910 if horizontal acceleration of the portable electronic device 120 is less than a preset negative acceleration. Further, the portable electronic device 120 may automatically transmit crash accident occurrence information to a designated contact based on determination that the crash accident has occurred.

It may be understood that the foregoing description of the disclosure is for the purpose of illustration and that those skilled in the art will readily understand that various changes in form and details may be made therein without departing from the spirit and scope of the present disclosure. It is therefore to be understood that the embodiments described above are illustrative in all aspects and not restrictive. For example, each component described as a single entity may be distributed and implemented, and components described as being distributed may also be implemented in a combined form.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A portable electronic device comprising:
a sensor; and
a controller configured to control the sensor to obtain information about an intensity of illumination around a vehicle in which a user of the portable electronic device is located, compare the obtained information about the intensity of illumination with at least one of intensity thresholds, and alert the user to turn on or off a light of the vehicle based on a result of the comparing, the vehicle being distinct from and external to the portable electronic device.

2. The portable electronic device of claim 1, wherein the controller is further configured to activate an illumination switching notification function after the portable electronic device enters a driving mode, and alert the user to turn on or off the light of the vehicle, when the illumination switching notification function is activated.

3. The portable electronic device of claim 1, wherein the controller is further configured to alert the user to turn on or off the light of the vehicle by using at least one of a visual method, an auditory method and a tactile method.

4. The portable electronic device of claim 1, wherein the controller is further configured to provide a message to alert the user to turn on or off the light of the vehicle.

5. The portable electronic device of claim 1, wherein the controller is further configured to alert the user to turn on the light of the vehicle if the intensity of illumination around the vehicle is less than a first intensity threshold.

6. The portable electronic device of claim 5, wherein the controller is further configured to alert the user to turn off the light of the vehicle if the intensity of illumination around the vehicle is greater than a second intensity threshold.

7. The portable electronic device of claim 6, wherein the controller is further configured to display a message informing the user to maintain a current illumination condition on a screen of the portable electronic device if the intensity of illumination around the vehicle is between the first intensity threshold and the second intensity threshold.

8. The portable electronic device of claim 1, wherein the controller is further configured to alert the user to turn on or off the light of the vehicle based on a preset time, and
the preset time is determined based on an illuminance condition of each season, spring, summer, autumn and winter.

9. A method of operating a portable electronic device, the method comprising:
obtaining information about an intensity of illumination around a vehicle in which a user of the portable electronic device is located, the vehicle being distinct from and external to the portable electronic device;
comparing the obtained information about the intensity of illumination with at least one of intensity thresholds; and
alerting the user to turn on or off a light of the vehicle based on a result of the comparing.

10. The method of claim 9, the method further comprising:
activating an illumination switching notification function after the portable electronic device enters a driving mode, and
wherein the alerting the user to turn on or off the light of the vehicle comprises alerting the user to turn on or off the light of the vehicle, when the illumination switching notification function is activated.

11. The method of claim 9, wherein the alerting the user to turn on or off the light of the vehicle comprises alerting the user to turn on or off the light of the vehicle by using at least one of a visual method, an auditory method and a tactile method.

12. The method of claim 9, wherein the alerting the user to turn on or off the light of the vehicle comprises providing a message to alert the user to turn on or off the light of the vehicle.

13. The method of claim 9, wherein the alerting the user to turn on or off the light of the vehicle comprises alerting the user to turn on the light of the vehicle if the intensity of illumination around the vehicle is less than a first intensity threshold.

14. The method of claim 13, wherein the alerting the user to turn on or off the light of the vehicle comprises alerting the user to turn off the light of the vehicle if the intensity of illumination around the vehicle is greater than a second intensity threshold.

15. The method of claim 14, the method further comprising displaying a message informing the user to maintain a current illumination condition on a screen of the portable electronic device if the intensity of illumination around the vehicle is between the first intensity threshold and the second intensity threshold.

16. The method of claim 9, the method further comprising alerting the user to turn on or off the light of the vehicle based on a preset time, and
   wherein the preset time is determined based on an illuminance condition of each season, spring, summer, autumn and winter.

\* \* \* \* \*